United States Patent

[11] 3,577,770

| [72] | Inventors | Stanley B. Shaw<br>Sunol;<br>Ronald H. Gehl; Gordon R. Roemer,<br>Fremont, Calif. |
|---|---|---|
| [21] | Appl. No. | 821,793 |
| [22] | Filed | May 5, 1969 |
| [45] | Patented | May 4, 1971 |
| [73] | Assignee | C T Supply Co.<br>Fremont, Calif. |

[54] TEST-CLOSURE FOR OPEN-TOPPED CONTAINERS
7 Claims, 3 Drawing Figs.

[52] U.S. Cl. ................................................. 73/49.8
[51] Int. Cl. .................................................. G01m 3/32
[50] Field of Search .................................... 73/49.8, 49.6, 49.2, 41, 45.1, 45.2; 138/90

[56] References Cited
UNITED STATES PATENTS
1,606,486  11/1926  Stevens ...................... 73/49.2

| 1,884,942 | 10/1932 | Widell ........................ | 73/41 |
| 2,645,117 | 7/1953 | Bendix et al. ................ | 73/49.2 |
| 3,198,004 | 8/1965 | Roberts et al. .............. | 73/45.1 |

*Primary Examiner*—Louis R. Prince
*Assistant Examiner*—William A. Henry, II
*Attorney*—Gardner & Zimmerman ABSTRACT: A test closure for use in an automatic can-testing machine operative to test open-topped containers prior to their being filled with a food product and sealed to make certain that an airtight chamber is established by the sidewall and bottom closure attached thereto. The test closure includes a thick resilient pad engageable with the angularly disposed, outwardly flared rim of such container to establish an hermetic seal therewith. The face of the test closure pad engageable with the container rim has an angular disposition essentially corresponding to that of the rim so as to be engageable with a relatively wide surface portion thereof.

Patented May 4, 1971 3,577,770
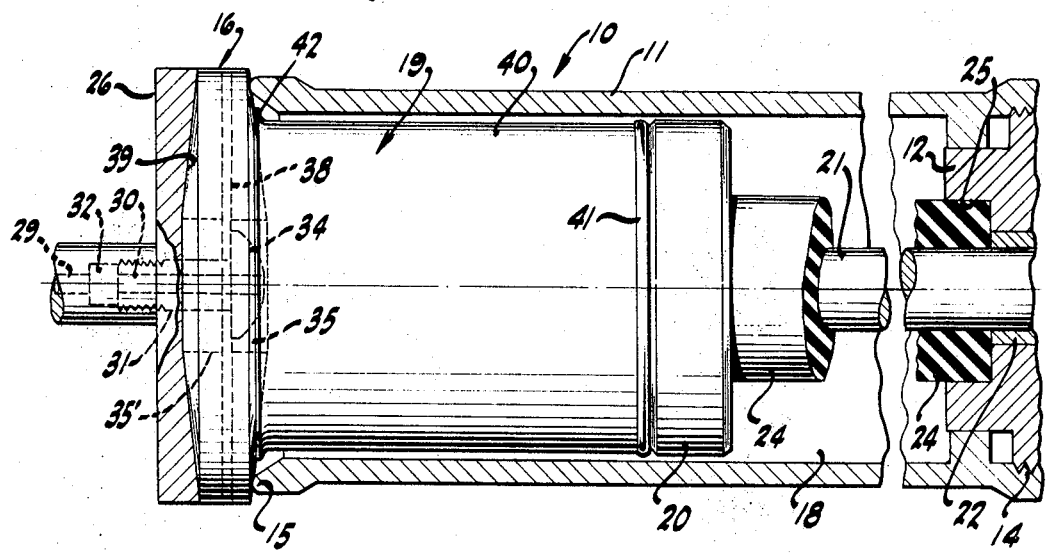
FIG.-1
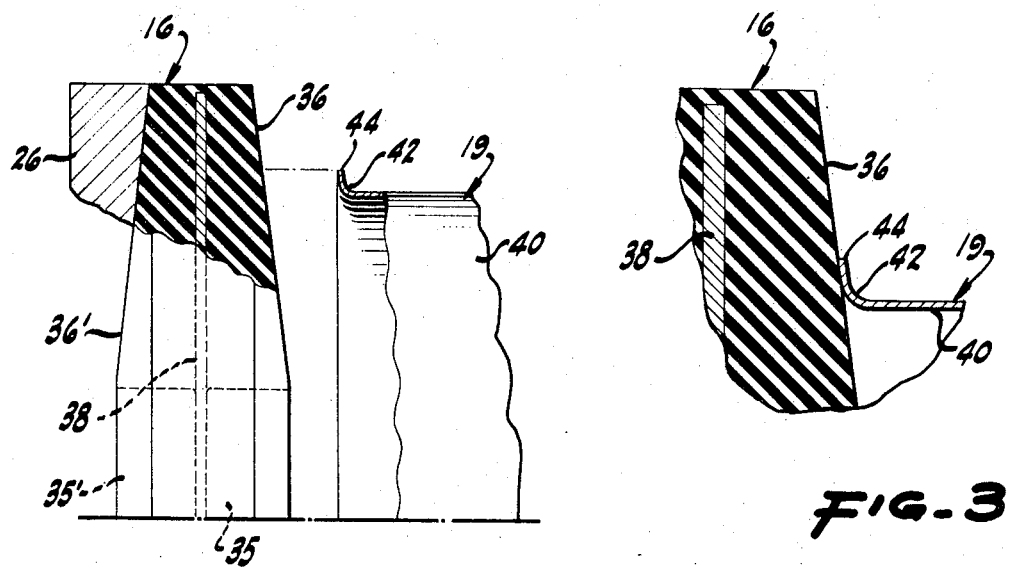
FIG.-2
FIG.-3
INVENTORS
STANLEY BUDD SHAW
RONALD H. GEHL
GORDON RALPH ROEMER
By
Gardner & Zimmerman
ATTORNEYS

TEST-CLOSURE FOR OPEN-TOPPED CONTAINERS

This invention relates generally to the art of testing cans or containers prior to their being filled with a food product and then sealed and, more particularly, to a test closure or can-test rubber for a can-testing machine operative to test such containers.

Containers of the type in which a considerable variety of food products are packaged for storage, shipment and sale to the consumer in a preserved condition are most frequently formed of metal and often referred to as cans, and the process by which such containers are filled is commonly known as canning. In the usual case, open-topped containers each comprising an upright sidewall having a bottom closure sealingly secured thereto are first fabricated, and then after being filled with a food product each such open container has a top closure sealingly attached to the sidewall thereof to sealingly confine the food product therewithin.

The general practice is to test each such open-topped container prior to its being filled with a food product to make certain that an airtight chamber is established by the sidewall and bottom closure attached thereto, and testing is most frequently accomplished by an apparatus known in the industry as an automatic can-testing machine. In machinery of this type, the open top of each container or can is temporarily covered and compressed air of predetermined pressure value injected thereinto. Any leakage from the container is detected by sensing means provided for this purpose, and defective containers are rejected by the machinery.

An object, among others, of the present invention is to provide an improved test closure for use in automatic can-testing machinery so as to temporarily close an open-topped container while the interior thereof is filled with a gas under pressure to test the container for leakage.

Another object of the invention is to provide an improved test closure of the character described that includes a resilient pad having a surface area thereof engageable with the open top of such container to establish a seal therewith, the resilient pad being engageable with such rim throughout a relatively wide surface portion thereof without significant penetration of the open top or rim of the container into the pad.

Still another object is in the provision of an improved test closure as described, in which the containers have an angularly disposed, outwardly flared rim at their open ends, and in which the surface area of the resilient pad engageable with such rim has an angular disposition essentially corresponding to that of the can rim.

A further object is to provide an improved test closure as described, in which the force required to establish an hermetic seal between the closure and the outwardly flared rim of a container closed thereby is relatively small, with the result that very little penetration of the rim into the resilient closure pad is effected, thereby reducing wear on the test closure and increasing the life thereof and at the same time establishing a high-quality hermetic seal between the test closure and container rim.

Additional objects and advantages, especially as concerns particular features and details of the invention, will become apparent as the specification proceeds.

An embodiment of the invention is illustrated in the accompanying drawing, in which:

FIG. 1 is a broken longitudinal sectional view illustrating one of the test pockets in an automatic can-testing machine and showing within such pocket an open-topped container or can in test position;

FIG. 2 is an enlarged, broken longitudinal sectional view showing the rim of an open-topped container in spaced relation with the test closure of such machine; and FIG. 3 is a further enlarged, fragmentary sectional view showing such test closure in sealing engagement with the rim of such container.

As respects automatic can-testing machines generally, they are old and well known in the art and, as indicated hereinbefore, are used to test open-topped containers or cans prior to their being filled with a food product and covered with a top closure to be certain that an airtight chamber is established by the sidewall and bottom closure of such container. The can-testing machines are of various size or capacity but in each instance are able to process a plurality of containers. For example, one such testing machine has 36 individual test pockets disposed in angularly spaced relation along the circumference of a rotatably carried wheel, and such machine may test containers at a rate of the order of 450 per minute. Other automatic testing machines may have fewer test pockets, such as 9 or 18. By way of example, an automatic testing machine in which the invention is useful may be a Borden's 36 Pocket Mechanical Tester sold by the Can Machinery Division of the Borden's Food Company of Randolph, New York.

Such can-testing machine has a plurality of tester pockets, one of which is illustrated in FIG. 1 and is denoted in general with the numeral 10. The pocket 10 has a cylindrical sidewall 11 equipped at one end with a base. In terms of construction, the base-equipped end of the sidewall 11 may be internally threaded and the base 12 externally threaded so as to define a mating screw connection, as shown at 14. At its opposite end, the pocket 10 is open and the sidewall defines an annular lip 15 that is slightly arcuate and is adapted to be sealingly engaged by a test closure 16, as will be described in greater detail hereinafter.

The pocket 10 defines a test chamber 18 therewithin adapted to receive an open-topped container 19 for test purposes. In this respect, a bottom clamp pad 20 of cylindrical configuration and of somewhat smaller diameter than the diameter of the test chamber 18 is located therewithin and is supported for reciprocable displacements along the longitudinal axis of the pocket 10 upon a shaft 21 that extends through the base 12 and is supported for reciprocable movement relative thereto in a bearing 22. The bottom clamp pad 20 is generally displaceable from the inner test position shown in FIG. 1 to an outer position (not shown) in which it projects slightly beyond the lip 15 of the test pocket so that the bottom closed end of a container 19 can be seated thereagainst.

Circumjacent the shaft 21 adjacent the bottom clamp pad 20 is a seal member 24 which is sometimes referred to in the industry as a bottom clamp pad rubber. The seal member 24 is formed of a resilient material such as rubber, and the purpose thereof is to prevent escape of compressed air from the lower end of the test chamber 18 especially along the slidably engaged surfaces of the rod 21 and bearing 22. In this respect, the seal member 24 is dimensioned to seat within an annular recess 25 formed in the base 12. The seal member 24 is secured to the rod 21 so as to reciprocate therewith, and the stroke of the rod is adjustable to enable the seal member 24 to seat within the recess with sufficient force to prevent the escape of compressed air through the bottom closure or base 12.

The test closure 16 is removably secured to a top clamp pad support 26 that is mounted upon a shaft 28 so as to reciprocate therewith along the longitudinal axis of the pocket 10. The clamp pad support 26 is provided with flow passage means through which compressed gas (usually compressed air) is injectable for test purposes into the open-topped container 19. In the form shown, such flow passage means includes a flow passage 29 extending along the shaft 28 and a flow passage 30 in open communication therewith that extends through a threaded stem or connector 31 that is secured within the end of the shaft 28 and extends through the support 26 at the center thereof. The test closure 16 is provided with a central opening therethrough that generally defines means accommodating injection of compressed gas into the container 19 and, in more particular terms, also provides a means for securing the test closure to the support 26 and shaft 28 so as to be reciprocable therewith.

In this respect, the connector 31 has a threaded end portion receivable within an enlarged threaded passage 32 provided in the shaft 28. The stem or connector 31 is also provided with an enlarged head 34 that seats within an annular recess 35 formed along the face 36 of the closure 16. The head 34 which bears against a stiff annular disc or reinforcing plate 38 (which may be formed of metal) embedded within the closure 16, and it may be observed that the plate 38 is at the midpoint of the disc and substantially normal to the longitudinal axis of the pocket 10 along which the closure 16 and support 26 are reciprocable. The plate 38 thereby defines the center plane of the closure.

More particularly as respects the test closure 16, it also comprises a relatively thick resilient pad formed of a suitable material such as rubber (natural or synthetic) molded about the plate 38. The closure is symmetrical about such plate, thereby enabling it to be reversibly secured to the support 26 so that either face of the closure may be used for sealing engagement of the lip 15 of the pocket 10 and open end of the container 19. In view of such symmetry, the opposite faces of the closure 16 are respectively denoted with the numerals 36 and 36', and the recesses respectively associated therewith are denoted with the numerals 35 and 35'. The faces 36 and 36' of the test closure have a nonplanar and somewhat convex shape and, therefore, the support 26 has a somewhat concave configuration, as shown at 39, which conforms essentially to the shape of each such face.

The container 19 is of the type often referred to as a can or tin can, and the particular container illustrated has a cylindrical sidewall 40 closed at its bottom end, as indicated by the circumferential bead 41 illustrated in FIG. 1. At its opposite end the container 19 is open, and it is equipped thereat with an angularly disposed, outwardly flared rim 42. The outer circumferential edge 44 of the rim 42 is thin and therefore sharp, and it may be somewhat ragged or irregular which contributes to the knifelike or cutting characteristics thereof. The rim 42 diverges outwardly from and projects along the longitudinal axis of the can, and the angular orientation of the rim in the container 19 shown is of the order of 7° relative to a transverse plane generally normal to such longitudinal axis and in engagement with the outermost surface or corner portion of the rim along the edge 44 thereof. Usually, the container 19 will be formed of metal, as shown, such as light gauge steel, and it may be coated along the surfaces thereof with a thin layer of tin.

The test closure 16 and thick pad thereof formed of resilient material is engageable with the rim 42 of the container 19 (as shown in FIGS. 1 and 3) so as to establish an hermetic seal therewith. In this respect, the surface area of the pad that engages the rim 42 has an angular disposition essentially the same as that of the rim so as to be engageable with a relatively wide surface portion thereof, as is most evident in FIG. 3. In accordance with the foregoing example of an angular orientation of a container rim 42, the angular disposition of the surface area engageable therewith of a suitable pad would also be of the order of 7°. Therefore, the resilient pad is engageable with the rim 42 throughout substantially its entire extent, as shown in FIG. 3.

The test closure 16 is quite thick at the center portion thereof whereat the recesses 35 and 35' are located, and it tapers outwardly at the aforementioned angular inclination so that the faces 36 and 36' tend to converge toward the perimeter or circumference of the test closure. The angular disposition of the faces 36 and 36' is initiated slightly beyond the outer extremities of the recesses 35 and 35' so that the surface area along which each face is angled is considerably more extensive than that of the container rim 42. As illustrated in FIG. 1, the diameter of the test closure 16 is somewhat larger than that of the test pocket 10 along the lip 15 thereof so that the test closure overlies such lip and is sealingly engageable therewith at about the same time, or essentially contemporaneously with, that the sealing engagement occurs of the test closure with the container rim 42.

In use of the test closure 16 and assuming the association thereof with the support 26 of an automatic can-testing machine, the test closure is used in conjunction with the bottom clamp pad 20 to confine the container 19 therebetween as it is moved conjointly thereby into a test pocket 10, is tested therewithin, and is thereafter removed from the test pocket, all by longitudinal displacement of the bottom clamp pad 20 in conjunction with the test closure 16. Evidently, the bottom clamp pad 20 is displaced outwardly from the test chamber 18 of the pocket 10 to receive and to release each container, and at the start of a cycle of processing, a container 19 is introduced between the clamp pad 20 and test closure 16 and is clamped therebetween by relative movement thereof toward each other. The container 19 is next displaced into the test pocket 18, as shown in FIG. 1, at which time the test closure 16 engages the lip 15 of the test pocket to define an hermetic seal therewith contemporaneously with the hermetic seal effected thereby with the rim 42 of the container 19.

A gas under pressure, which is usually compressed air as stated, is then injected through the passages 29 and 30 into the chamber 19 and the pressure maintained therewithin for a predetermined test interval as, for example, 10 seconds. If no leakage from the container 19 into the test chamber 18 occurs during such test interval, the container is satisfactory. In the event that leakage does occur, the container is defective and is rejected by the automatic testing machinery. During such test, the seal member 24 prevents the escape of pressurized gas from the chamber 18 in the event that such gas escapes thereinto from a defective container; and a pressure-sensing system (not shown) associated with the test pocket 10 and chamber 18 thereof senses or detects any such escape of gas into the chamber 18 and causes the machinery to reject the defective container from which the escape occurs.

Conformance of the configurated faces 36 and 36' of the closure member 16 with the angular disposition of the rim 42 of the container 19 has a number of advantages. One such advantage is the excellence of the hermetic seal effected between the face of the test closure and contiguous surface portion of the rim 42. Further, the magnitude of the compressive force necessary to effect such seal is relatively small and, in fact, is about one-third the magnitude of the force required to effect a seal in tests made with a test closure in which the face thereof is substantially planar. Such reduction in force contemporaneously with obtaining a better seal than that effected with a planar surface is quite unexpected since it is generally thought that a line-contact between two surfaces results in a better seal than when the seal is obtained through a large-surface-contact; and, evidently, a planar surface would tend to give such line-contact which is in contradistinction to the large-surface-contact defined between the face 36 of the closure 16 and contiguous surface of the rim 42.

Using a smaller compressive force to effect the seal between the test closure and container rim has the advantage of reducing the extent of the penetration of the container rim 42 into the face 36 of the test closure. Again comparing the extent of penetration to that occurring when the much larger compressive force is applied to effect a seal with a planar surface, the penetration is about one-third that necessary with a planar surface in order to obtain the requisite hermetic seal. It will be appreciated that reducing the extent of penetration of the rim 42 into the face 36 of the test closure materially reduces the wear along the face of the test closure, thereby extending the useful life of the test closure to a significant degree. Such increase in useful life is an important contribution because the rim 42 of each container 19 is quite sharp, and it is surprising to observe the extent to which the container rims cut into the face of the test closure during prolonged use thereof.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

We claim:

1. A test closure for a can-testing machine or the like having a clamp pad support provided with flow passage means through which compressed gas is injectable for test purposes into an open-topped container equipped with an angularly disposed outwardly flared rim toward and away from which such support is selectively displaceable, comprising a relatively thick pad of substantially solid cross section securable to such support for movement therewith toward such rim and into engagement therewith and being resilient along the surface area thereof engageable with such rim so as to establish an hermetic seal therewith, a thin stiff reinforcing plate embodied by said pad and lying in a plane substantially normal to the direction of movement of said pad toward such rim, said resilient surface area having an acute angular disposition relative to such plane essentially the same as that of such rim so as to be engageable with a relatively wide surface portion thereof, and said pad and plate each providing a central opening therethrough for accommodating injection into a container engaged by said pad of compressed gas from the aforementioned flow passage means.

2. The test closure of claim 1 in which said pad is formed entirely of a resilient material so as to be resilient throughout, and in which said plate is embedded within the interior of said pad.

3. The test closure of claim 2 in which said plate is disposed along a plane through the center of said pad and said pad is substantially symmetrical about said plate and is provided with a second resilient surface area having an acute angular disposition so as to be reversible.

4. The test closure of claim 3 in which said plate extends substantially to the outer perimetric edge portion of said pad, and in which the central opening through said pad comprises a large recess extending inwardly toward said plate on each side thereof to enable mounting structure to bear more directly thereagainst for securing said pad to the aforementioned support.

5. The test closure of claim 4 in which each of said acute angles is of the order of 7°.

6. The test closure of claim 1 in which the central opening through said pad comprises a large recess extending inwardly toward said plate to enable mounting structure to bear more directly thereagainst for securing said pad to the aforementioned support.

7. The test closure of claim 6 in which said pad is formed entirely of a resilient material so as to be resilient throughout, and in which said plate extends substantially to the outer perimetric edge portion of said pad.